United States Patent Office 3,356,717
Patented Dec. 5, 1967

3,356,717
PRODUCTION OF ALKYL SULFONATE
Clarence L. Furrow, Bartlesville, Okla., assignor to Phillips Petroleum Company, a corporation of Delaware
No Drawing. Filed June 19, 1964, Ser. No. 376,556
8 Claims. (Cl. 260—513)

This invention relates to an improved process for the production of alkyl sulfonates. In another aspect, this invention relates to an improved process for the production of an alkyl sulfonate from an alkene having at least 12 carbon atoms per molecule.

There is considerable interest in the production of biodegradable detergents. Considerable research has been directed to the discovery of processes for the economical production of these biodegradable detergents. While a greater proportion of the research work in biodegradable detergents has been devoted to the preparation of alkylbenzene sulfonates wherein the alkyl group has a relatively unbranched structure, considerable research efforts have been devoted to the synthesis of alkyl sulfates, alkyl sulfonates, and the like.

It has been discovered that ammonium bisulfite or sodium bisulfite can be added to 1-octene in the presence of certain initiators and solvents. However, when an attempt is made to employ higher molecular weight olefins, such as 1-dodecene, to prepare a detergent sulfonate by this method, the conventional initiator-solvent combinations normally employed are found to be unsatisfactory.

Accordingly, an object of my invention is to provide an improved process for the production of alkyl sulfonates.

Another object of my invention is to provide a process for the addition of a bisulfite to an alkene having at least 12 carbon atoms per molecule to form an alkyl sulfonate.

Other objects, advantages and features of my invention will be readily apparent to those skilled in the art from the following description and the appended claims.

By my invention, I have provided a process for the production of alkyl sulfonates in high yield by the addition of a bisulfite to an alkene having at least 12 carbon atoms per molecule in the presence of water and a novel initiator-solvent combination.

Alkenes which are reacted with a bisulfite according to the process of this invention will contain at least 12 carbon atoms per molecule, preferably from 12 to about 20 carbon atoms per molecule. While the process of this invention is suitable for the reaction of straight chain and branched chain olefins with bisulfite compounds, it is particularly applicable to the reaction of bisulfite compounds with straight chain olefins, preferably 1-olefins. Some specific examples of olefins which can be reacted with bisulfite compounds according to the process of this invention include 1-dodecene, 1-tetradecene, 1-hexadecene, 1-octadecene, 1-eicosene, 6-tridecene, 4-propyl-3-decene, 4-methyl-4-tridecene, 2-methyl-1-pentadecene, 9-octadecene, 1-nonadecene, 2-methyl-1-nonadecene, and the like.

The bisulfite employed in the process of my invention has the formula $MHSO_3$, wherein M is selected from the group consisting of sodium, potassium, lithium, rubidium, cesium and ammonium. The concentration of the bisulfite compound in the reaction zone preferably is sufficient to provide from 1 to 2 mols of the bisulfite compound per mol of the alkene feed to the reaction zone. The bisulfite compound can be introduced directly into the reaction or it can be introduced into the reaction zone as a water solution of the bisulfite compound.

The reaction of an alkene with a $MHSO_3$ compound is conducted in the presence of water. The concentration of water in the reaction zone will preferably range from about 0.5 to about 10 grams of water per gram of bisulfite compound fed to the reaction zone.

I have discovered that by conducting the reaction in the presence of a novel initiator-solvent combination wherein the said initiator of said combination is selected from the group consisting of tert-butyl peracetate, tert-butyl perisobutyrate, the salt of azobisisobutyramidine and mixtures thereof and said solvent is selected from the group consisting of pyridine, ethanol, isopropanol, n-propanol, and mixtures thereof, that high yields of alkyl sulfonates are produced in the reaction zone. While other salts of azobisisobutyramidine can be employed in the process of my invention, the hydrochloride, acetate and sulfate salts are particularly applicable to the inventive process. The concentration of initiator present in the reaction zone will normally range from 0.005 to 0.05 mol per mol of alkene feed to the reaction zone. The concentration of organic solvent present in the reaction zone will normally range from about 0.1 to 2 volumes per volume of water present in the reaction zone. The initiator can be introduced directly into the reaction zone or, for example, in the case of tert-butyl peracetate and tert-butyl perisobutyrate, the initiator can be introduced into the reaction zone in an inert solvent such as benzene or a paraffinic hydrocarbon.

The reaction of the alkene with the bisulfite compound is conducted at a temperature sufficient to effect decomposition of the initiator and at a temperature below that at which degradation of the alkyl sulfonate product occurs. Generally, the reaction temperature will range from about 30° C. to about 150° C. The pressure in the reaction zone will generally be autogenous and the reaction time will vary from a few minutes to 50 hours.

The reaction can be conducted either batch-wise or continuous but it is preferred to operate batch-wise. The constituents of the reaction mixture can be introduced independently into the reaction or the various constituents can be premixed and introduced into the reaction zone as a mixture or mixtures.

After the reaction is complete, the reaction mixture can be subjected to an evaporation step wherein water and organic solvent are separated from the product alkyl sulfonate. Alkyl sulfonate yields of at least 75 percent are obtained by the inventive process. The "yield" as the term is herein employed is the weight percent of olefin feed charged to the reaction zone converted to the alkyl sulfonate.

The following specific example is presented to illustrate the objects and advantages of the invention of employing particular initiator-solvent combinations in the reaction of an alkene having at least 12 carbon atoms per molecule with a bisulfite compound.

EXAMPLE

A series of runs was conducted in which sodium bisulfite was reacted with 1-dodecene in the presence of water, a solvent and an initiator. In each of the runs, the dodecene, bisulfite, water, solvent and initiator were charged to a stainless steel bomb, after which the bomb was heated to the desired reaction temperature and rocked for the indicated reaction time, as indicated in the following table. After the desired reaction time, shown in the table, the bomb was cooled and opened. The solvents, water and organic solvents were evaporated and the yield of sodium dodecyl sulfonate was determined by the methylene blue test (ASTM D–1681–59T). The tert-butyl peracetate and tert-butyl perisobutyrate used was a 75 percent by weight solution in benzene. The azobisisobutyramidine hydrochloride was introduced as a solid into the bomb. The results of these runs are expressed below in the following table.

TABLE

| Run No. | Temp., °C. | Time, Hours | Mols Bisulfite | Mols 1-dodecene | Initiator | Grams Initiator | Cosolvent Used | Ml. Cosolvent | Ml. H₂O | Yield Dodecyl Sulfonate, wt. percent |
|---|---|---|---|---|---|---|---|---|---|---|
| 1 | 125 | 16 | 0.2 | 0.2 | DTBP [1] | 0.22 | Pyridine | 40 | 40 | 1.6 |
| 2 | 125 | 16 | 0.3 | 0.2 | DTBP | 0.22 | IsoPrOH | 40 | 60 | 1.70 |
| 3 | 125 | 16 | 0.3 | 0.2 | DTBP | 0.22 | MeOH | 40 | 60 | 0.129 |
| 4 | 125 | 16 | 0.3 | 0.2 | DTBP | 0.22 | EtOH | 40 | 60 | 0.69 |
| 5 | 125 | 16 | 0.3 | 0.2 | DTBP | 0.22 | nPrOH | 40 | 60 | 17.5 |
| 6 | 115 | 48 | 0.3 | 0.2 | t-BuOOH | 0.28 | MeOH | 40 | 60 | 0.186 |
| 7 | 115 | 48 | 0.3 | 0.2 | t-BuOOH | 0.28 | IsoPrOH | 40 | 60 | 4.79 |
| 8 | 115 | 48 | 0.3 | 0.2 | t-BuOOH | 0.28 | EtOH | 40 | 60 | 0.82 |
| 9 | 100 | 2 | 0.2 | 0.2 | TBPB [2] | 0.41 | MeOH | 40 | 40 | 6.02 |
| 10 | 100 | 2 | 0.3 | 0.2 | TBPB | 0.41 | MeOH | 40 | 60 | 1.15 |
| 11 | 100 | 2 | 0.3 | 0.2 | TBPB | 0.41 | EtOH | 40 | 60 | 29.7 |
| 12 | 100 | 2 | 0.3 | 0.2 | TBPA [3] | 0.33 | tBuOH | 40 | 60 | 3.5 |
| 13 | 100 | 2 | 0.3 | 0.2 | TBPA | 0.33 | MeOH | 40 | 60 | 2.95 |
| 14 | 100 | 2 | 0.3 | 0.2 | TBPA | 0.33 | EtOH | 40 | 60 | 83.5 |
| 15 | 100 | 2 | 0.3 | 0.2 | TBPA | 0.33 | Pyridine | 40 | 60 | 78.8 |
| 16 | 100 | 2 | 0.3 | 0.2 | TBPA | 0.33 | IsoPrOH | 40 | 60 | 79.5 |
| 17 | 100 | 2 | 0.3 | 0.2 | TBPA | 0.33 | nPrOH | 40 | 60 | 94.0 |
| 18 | 100 | 2 | 0.3 | [4] 0.2 | TBPA | 0.33 | nPrOH | 40 | 60 | 84.6 |
| 19 | 100 | 2 | 0.3 | 0.2 | TBPB [5] | 0.18 | nPrOH | 40 | 60 | 95.3 |
| 20 | 125 | 2 | 0.3 | 0.2 | ABBA [6] | 0.80 | nPrOH | 40 | 60 | 88.0 |
| 21 | 100 | 2 | 0.2 | 0.3 | TBPA | 0.33 | nPrOH plus Pyridine | 20 / 20 | 60 | 91.8 |

[1] DTBP is di-tert-butyl peroxide.
[2] TBPB is tert-butyl perbenzoate.
[3] TBPA is tert-butyl peracetate.
[4] 1-tetradecene used instead of 1-dodecene in this run.
[5] Tert-butyl perisobutyrate.
[6] Azobisisobutyramidine hydrochloride.

Runs 1–13 produced low yields of the product sodium dodecyl sulfonate. Runs 14–21 are illustrative of the invention and demonstrate the effectiveness and special significance of the particular initiator-solvent combinations to produce alkyl sulfonates in high yields from an alkene having at least 12 carbon atoms per molecule. Run 21 demonstrates the effectiveness of the invention to employ an initiator and a pair of solvents to produce alkyl sulfonates.

As will be evident to those skilled in the art, various modifications of this invention can be made, or followed, in the light of the foregoing disclosure, without departing from the spirit or scope thereof.

I claim:
1. A process for the production of an alkyl sulfonate which comprises reacting in a reaction zone at a temperature from about 30° C. to 150° C. dodecene with a bisulfite of the formula $MHSO_3$, wherein M is selected from the group consisting of sodium, potassium, lithium, rubidium, cesium and ammonium, said reacting conducted in the presence of water and an initiator-solvent combination wherein said combination is selected from the group consisting of
    (a) tert-butyl peracetate with ethanol,
    (b) tert-butyl peracetate with n-propanol,
    (c) tert-butyl peracetate with isopropanol,
    (d) tert-butyl peracetate with pyridine,
    (e) tert-butyl peracetate with a 50/50 mixture of n-propanol and pyridine,
    (f) tert-butyl perisobutyrate with n-propanol, and
    (g) azobisisobutyramidine hydrochloride with n-propanol,
wherein the concentration of said bisulfite in said reaction zone will range from about 1–2 mols per mol of alkene feed to said reaction zone, the concentration of initiator present will range from about 0.005 to about 0.05 mol per mol of alkene feed to said reaction zone, the concentration of water in said reaction zone will range from about 0.5–10 grams per gram of sulfite compound, and the concentration of said solvent in said reaction zone will range from about 0.1 to 2 volumes per volume of water.

2. A process according to claim 1 wherein said bisulfite is sodium bisulfite and said initiator-solvent combination is tert-butyl peracetate with ethanol.

3. A process according to claim 1 wherein said bisulfite is sodium bisulfite and said initiator-solvent combination is tert-butyl peracetate with n-propanol.

4. A process according to claim 1 wherein said bisulfite is sodium bisulfite and said initiator-solvent combination is tert-butyl peracetate with isopropanol.

5. A process according to claim 1 wherein said bisulfite is sodium bisulfite and said initiator-solvent combination is tert-butyl peracetate with pyridine.

6. A process according to claim 1 wherein said bisulfite is sodium bisulfite and said initiator-solvent combination is tert-butyl perisobutyrate with n-propanol.

7. A process according to claim 1 wherein said bisulfite is sodium bisulfite and said initiator-solvent combination is azobisisobutyramidine hydrochloride with n-propanol.

8. A process for the production of an alkyl sulfonte which comprises reacting in a reaction zone at a temperature from about 30° C. to 150° C. tetradecene with a bisulfite of the formula $MHSO_3$, wherein M is selected from the group consisting of sodium, potassium, lithium, rubidium, cesium and ammonium, said reacting conducted in the presence of water and an initiator-solvent combination wherein said combination is selected from the group consiting of tert-butyl peracetate with N-propanol, wherein the concentration of said bisulfite in said reaction zone will range from about 1–2 mols per mol of alkene feed to said reaction zone, the concentration of initiator present will range from about 0.005 to about 0.05 mol per mol of alkene feed to said reaction zone, the concentration of water in said reaction zone will range from about 0.5–10 grams per gram of sulfite compound, and the concentration of said solvent in said reaction zone will range from about 0.1 to 2 volume per volume of water.

References Cited

UNITED STATES PATENTS 2,504,411  4/1950  Harman _____ 260—513
2,599,299  6/1952  Upson _____ 260—503

OTHER REFERENCES

Haines et al., J. Chem. Soc., L958, 3221–2.

LORRAINE A. WEINBERGER, *Primary Examiner.*
M. WEBSTER, *Assistant Examiner.*